April 9, 1940.  W. R. KOCH  2,196,590
AUTOMATIC MONITOR
Filed Nov. 15, 1938
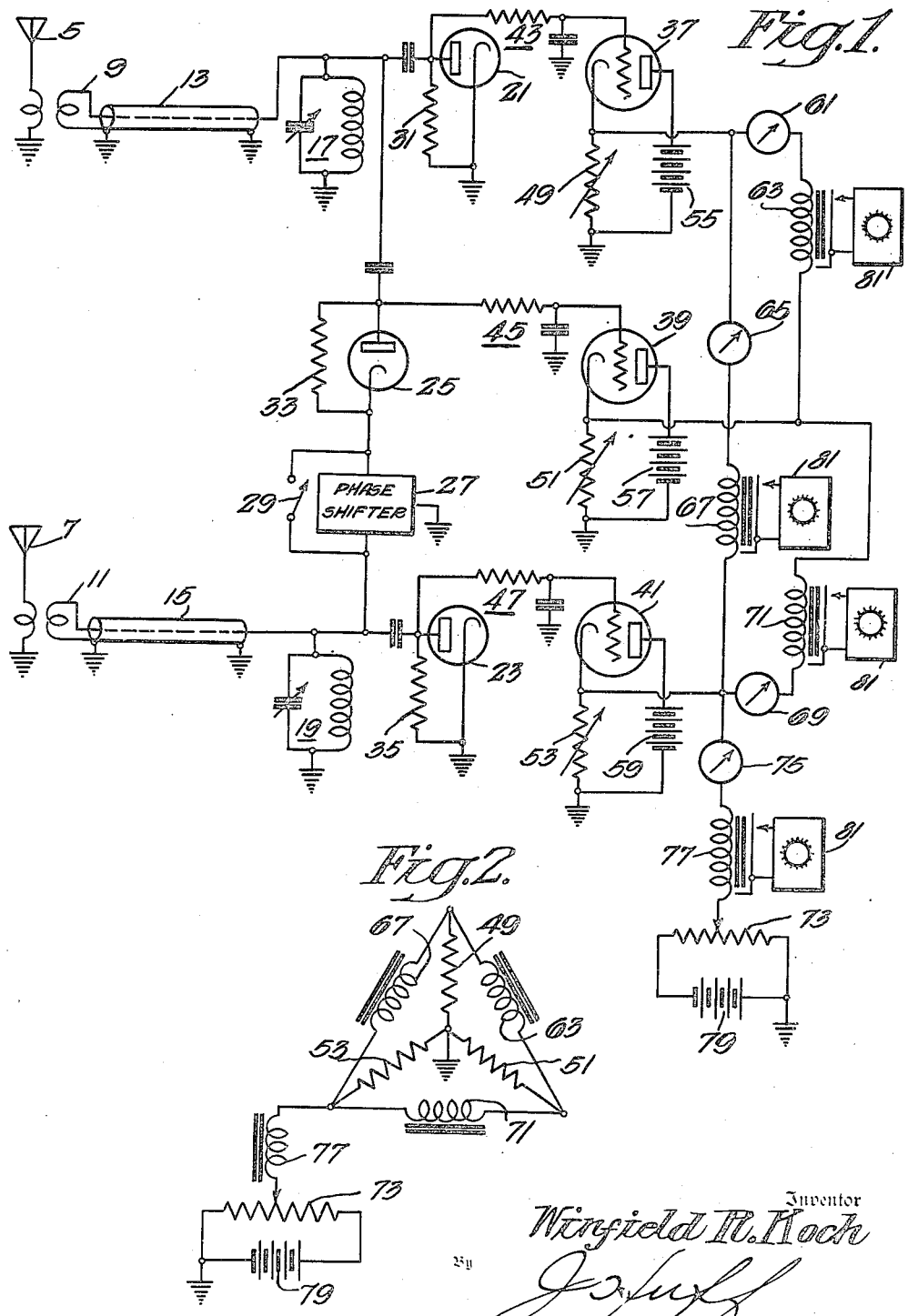
Inventor
Winfield R. Koch
By
Attorney Patented Apr. 9, 1940

2,196,590

UNITED STATES PATENT OFFICE 2,196,590

AUTOMATIC MONITOR

Winfield R. Koch, Haddonfield, N. J., assignor to Radio Corporation of America, a corporation of Delaware Application November 15, 1938, Serial No. 240,462

3 Claims. (Cl. 250—11)

This invention relates to monitoring devices and, more particularly, to an automatic monitor or alarm system for indicating changes in the relative phase or amplitude of two alternating currents.

Among the objects of this invention are the provision of means for monitoring the phase and amplitude relations of two alternating currents; the provision of means for monitoring the relative phase and amplitude of currents in an antenna array; the provision of means for monitoring changes in the amplitude of radio frequency currents in an antenna; the provision of means for automatically indicating a deviation from predetermined current conditions in an antenna array; and the provision of means for operating a plurality of warning signals when any adjustment of an antenna array deviates from normal.

It is necessary in the operation of certain devices to establish and maintain alternating currents having a predetermined phase and a constant ratio of amplitudes. Such is the case, for example, in a directional antenna array in which the antenna currents must be definitely related in amplitude and phase in order to provide the desired directional radiation pattern.

In many instances, it is also desirable to monitor the operation of a device from a remote point. Again, taking the example of the antenna array, it is desirable to provide in the transmitter room an automatic monitoring system which will give a warning to the operator the instant anything happens to the transmitter or to the antennas themselves which causes a change in the normal condition of operation.

I am aware that there have been provided phase monitors in which a cathode ray tube is used to indicate the actual phase relation of two currents. It is not the purpose of this invention to provide a substitute for such a device, but rather to provide an economical device which can be used in conjunction with such an indicator to call the operator's attention to a change in the normal condition of a transmitter which might otherwise pass unnoticed, and to relieve the operator from the necessity of keeping a constant watch on his instruments.

This invention will be better understood from the following description when considered in connection with the accompanying drawing. Its scope is indicated by the appended claims.

Referring to the drawing, Fig. 1 is a schematic diagram of my invention; and Fig. 2 is a schematic diagram representing a portion of Fig. 1 to aid in the understanding of this invention.

While this invention is applicable to the monitoring of voltages or currents from any source, I have illustrated its operation in conjunction with two antennas 5 and 7 of a directional array, as shown in Fig. 1. A pair of coupling coils 9 and 11 are respectively coupled to the antennas 5 and 7, and are connected to the monitor by transmission lines 13 and 15. The transmission lines are preferably of the same length and are tuned to resonance, respectively, by shunt-connected tank circuits 17 and 19.

The voltages appearing across the tank circuits 17 and 19 are applied, respectively, to a pair of diode detectors 21 and 23. A third or differential diode detector 25 is connected between the high potential terminals of the two tank circuits through a phase-shifting device 27, which may be short-circuited by a switch 29. The rectified direct current voltages which are developed across the diode load resistors 31, 33 and 35, are applied, respectively, to the input electrode of three amplifiers 37, 39, and 41. To aid in the filtering, a resistance-capacitance filter is connected between each rectifier and amplifier, as shown at 43, 45 and 47.

Each amplifier is provided with a variable cathode resistor 49, 51 and 53. Anode potential is supplied to the three amplifiers by three batteries 55, 57 and 59, or the like. The cathode of tube 37 is connected to the cathode of tube 39 through a meter 61 and a relay 63. The cathode of tube 37 is also connected to the cathode of tube 41 through a meter 65 and a relay 67. The cathode of tube 39 is connected to the cathode of tube 41 through a meter 69 and a relay 71. The cathode of tube 41 is connected to the movable arm of a potentiometer 73 through a meter 75 and a relay 77. The potentiometer 73 is connected across the terminals of a battery 79, one terminal of which is grounded.

The various relays which have been included in this device are single pole relays which are energized by current flowing through their windings in either direction. The armatures are normally biased so that the contacts are open. Each relay is connected to an indicating device 81 which may consist of a battery and a light bulb, a bell, or any similar device which will attract the attention of the transmitter operator. The meters which are connected in series with the relays are useful in determining the magnitude of the change in current phase or amplitude.

The radio frequency current in the antenna 5 produces in the cathode resistor 49 a direct current potential whose value is proportional to the amplitude of the radio frequency current. The current through cathode resistor 53 likewise produces a direct current potential which is proportional to the amplitude of the radiofrequency current in the antenna 7. The direct current potential which is developed across cathode resistor 51 is proportional to the instantaneous amplitude difference between the radio frequency currents in the two antennas. Consequently, the potential drop across resistor 51 is dependent upon the relative phase of the currents in the two antennas. In case it is desired to operate the system with the currents in the two antennas of equal amplitude and in phase, it is apparent that no potential difference will appear across the diode rectifier 25. Consequently the potential drop across resistor 51, assuming that it has the same value as resistors 49 and 53, will differ from the potential drop across resistors 49 and 53. To maintain the indicating system in balanced condition during the normal operation of the antenna array, it is desirable that the potential drop across all three cathode resistors be equal. This may be accomplished by suitably adjusting the value of the cathode resistor 51, and by shifting the phase of the current which is applied to the rectifier 25, so that an effective potential difference is obtained which provides a bias for the grid of amplifier 39 which is more nearly equal to that provided by rectifiers 21 and 23.

This invention is not concerned with the actual measurement of the amplitude and phase of the currents in the two antennas. Assuming that proper adjustments have been made, the monitor is put into operation by adjusting the three cathode resistors 49, 51 and 53, as indicated above, until the potential drop across each resistor has the same value. Referring to Fig. 2, which illustrates the three cathode resistors and the connections to the four relays, it is evident that, when the potential across each resistor is the same, no current will flow through the energizing coils of the relays 63, 67 and 71. By suitably adjusting the potentiometer 73, a balance between the potential across resistor 53 and the potential on the arm of the potentiometer is obtained, so that no current flows through relay 77. In such a condition, none of the indicators 81 are operated, since the relay contacts are open.

If the phase of the current in one antenna with respect to the current in the other antenna shifts, for any reason, the effective potential across the rectifier 25 will likewise change. This causes a change in the bias on amplifier 39, which results in a change in the potential across resistor 51. From Fig. 3, it will be apparent that current will flow through relays 63 and 71 and the corresponding indicators will be activated.

If the amplitude of the current in antenna 5 changes, the phase remaining constant, the recified bias which is applied to the amplifier tube 37 will change, causing the potential drop across resistor 49 to change likewise. Again referring to Fig. 3, it will be seen that this will cause current to flow through and activate relays 63 and 67, thus operating their respective indicators.

If the current in antenna 7 changes in amplitude, the phase remaining constant, the potential drop across resistor 53 will be affected so as to operate relays 67, 71 and 77. If the currents in antennas 5 and 7 change equally, and if their phase remains constant, it is apparent that the voltages across the cathode resistors 49, 51 and 53 will likewise change equally, and relays 63, 67 and 71 will not be affected. However, the change in the potential across resistor 53 will operate relay 77 and an indication will be obtained.

A monitor has thus been provided which gives a warning signal in response to changes in the relative phase, the relative amplitude, or the absolute amplitude of the currents in two antennas. The operator need not constantly watch the transmitter because a warning signal will be given the instant the normal operation of the system ceases. There is no danger that the failure of a component part of the monitor will make the device inoperative, yet provide the indication of normal operation, for the failure of any component part will unbalance the system so as to cause one or more of the indicators to flash an alarm.

I claim as my invention:

1. In a device of the character described, a pair of antennas, an indicating device, means coupling said antennas to said device, said device comprising a pair of rectifiers connected, respectively, to said antennas for obtaining two normally equal direct current voltages respectively proportional to the amplitude of the currents in said antennas, a third rectifier and a phase shifter serially connected between said antennas for obtaining a third direct current voltage the amplitude of which is normally equal to the amplitudes of said two voltages, and which varies in accordance with relative changes in the phases of the currents in said antennas, and a plurality of indicators responsive, respectively, to a deviation of each of said voltages from said condition of equality.

2. In a device of the character described, two antennas in which the amplitude and relative phase of the currents are to be monitored, a pair of rectifiers, a pair of transmission lines respectively coupling said antennas and said rectifiers, a third rectifier, means for connecting said third rectifier to said transmission lines, means for obtaining three direct current voltages from said three rectifiers, a relay operable by a difference in potential between said first and second voltages, a relay operable by a different in potential between said first and third voltages, a relay operable by a difference in potential between said second and third voltages, a relay responsive to a change in the absolute value of one of said voltages, and indicator means operated by said relays for giving a warning when said antenna currents deviate from predetermined value.

3. A device as described in claim 1 which is further characterized by phase shifting means connected in series with said third rectifier.

WINFIELD R. KOCH.